United States Patent
Nobuta et al.

(10) Patent No.: US 9,183,990 B2
(45) Date of Patent: Nov. 10, 2015

(54) ELECTROCONDUCTIVE POLYMER COMPOSITION, ELECTROCONDUCTIVE POLYMER MATERIAL, ELECTROCONDUCTIVE SUBSTRATE, ELECTRODE AND SOLID ELECTROLYTIC CAPACITOR

(71) Applicant: NEC TOKIN Corporation, Sendai-shi, Miyagi (JP)

(72) Inventors: Tomoki Nobuta, Sendai (JP); Yasuhisa Sugawara, Sendai (JP); Satoshi Suzuki, Sendai (JP); Yasuhiro Tomioka, Sendai (JP)

(73) Assignee: NEC Tokin Corporation, Miyagi (JP)

( * ) Notice: Subject to any disclaimer, the term of this patent is extended or adjusted under 35 U.S.C. 154(b) by 215 days.

(21) Appl. No.: 13/708,489

(22) Filed: Dec. 7, 2012

(65) Prior Publication Data
US 2013/0163149 A1 Jun. 27, 2013

(30) Foreign Application Priority Data
Dec. 12, 2011 (JP) .................. 2011-271246

(51) Int. Cl.
*H01G 9/032* (2006.01)
*H01B 1/14* (2006.01)
(Continued)

(52) U.S. Cl.
CPC ............... *H01G 9/032* (2013.01); *H01B 1/14* (2013.01); *H01B 1/20* (2013.01); *H01G 9/0036* (2013.01);
(Continued)

(58) Field of Classification Search
CPC ..... H01G 9/032; H01G 9/0036; H01G 9/028; H01G 11/48; H01B 1/14; H01B 1/20

USPC .......................................................... 524/210
See application file for complete search history.

(56) References Cited

U.S. PATENT DOCUMENTS 6,987,663 B2 1/2006 Merker et al.
7,697,267 B2 4/2010 Oohata et al.
(Continued)

FOREIGN PATENT DOCUMENTS

CN 101217187 A 7/2008
CN 101649054 A 2/2010
(Continued)

OTHER PUBLICATIONS

Kirchmeyer et al. J. Mater. Chem., 2005, 15, 2077-2088. Scientific importance, properties and growing applications of poly(3,4-ethylenedioxythiophene).*

(Continued)

*Primary Examiner* — John Uselding
(74) *Attorney, Agent, or Firm* — Foley & Lardner LLP

(57) ABSTRACT

Provided is an electroconductive polymer composition with a good film forming property. Also, provided is an electroconductive polymer material with a high electroconductivity and a high transparency as well as an electroconductive substrate having the electroconductive polymer material on a substrate, and an electrode. Further, provided is an electronic device having the electrode as well as a solid electrolytic capacitor with a high capacitance and a low ESR. Disclosed is an electroconductive polymer composition, containing an electroconductive polymer in which a dopant is doped, a water-soluble polymer resin, and a solvent which contains water and an organic solvent whose dielectric constant is higher than that of water.

16 Claims, 1 Drawing Sheet

(51) Int. Cl.
*H01G 9/00* (2006.01)
*H01G 9/028* (2006.01)
*H01B 1/20* (2006.01)
*H01G 11/48* (2013.01)
*H01G 11/56* (2013.01)
*H01G 9/15* (2006.01)

(52) U.S. Cl.
CPC ............... *H01G 9/028* (2013.01); *H01G 11/48* (2013.01); *H01G 11/56* (2013.01); *H01G 9/15* (2013.01); *Y02E 10/542* (2013.01); *Y02E 10/549* (2013.01); *Y02E 60/13* (2013.01); *Y10T 428/31551* (2015.04); *Y10T 428/31562* (2015.04); *Y10T 428/31721* (2015.04); *Y10T 428/31786* (2015.04); *Y10T 428/31855* (2015.04)

(56) References Cited

U.S. PATENT DOCUMENTS

| | | |
|---|---|---|
| 7,990,064 B2 | 8/2011 | Ohmura et al. |
| 2004/0152832 A1 | 8/2004 | Kirchmeyer et al. |
| 2008/0193730 A1 | 8/2008 | Ohkubo et al. |
| 2009/0220796 A1 | 9/2009 | Kato et al. |
| 2009/0302311 A1 | 12/2009 | Turbiez et al. |
| 2010/0033905 A1 | 2/2010 | Kobayakawa et al. |
| 2011/0122546 A1* | 5/2011 | Nobuta et al. ................. 361/524 |

FOREIGN PATENT DOCUMENTS

| | | | |
|---|---|---|---|
| CN | 101848962 A | 9/2010 | |
| CN | 101999152 A | 3/2011 | |
| CN | 102082028 A | 6/2011 | |
| JP | 2000-153229 A | 6/2000 | |
| JP | 2004-59666 A | 2/2004 | |
| JP | 2005-123630 A | 5/2005 | |
| WO | WO 2009/054572 | * 4/2009 | ................. C08J 5/22 |
| WO | WO-2009/131011 A1 | 10/2009 | |
| WO | WO-2009/131012 A1 | 10/2009 | |

OTHER PUBLICATIONS

Office Action mailed Jul. 8, 2014 in related Chinese Application No. 201210517511.1 with English-language translation (15 pgs.).
Office action mailed Jul. 22, 2014 in related Chinese application No. 201210518287.8 with English-language translation (9 pgs.).
U.S. Appl. No. 13/708,512, filed Dec. 7, 2012, Nobuta et al.
Non-final office action mailed Feb. 5, 2015 in co-pending U.S. Appl. No. 13/708,512 (10 pgs.).
Office Action mailed Jun. 1, 2015 in related Chinese application No. 20120518287.8 with English-language translation (12 pgs.).

* cited by examiner

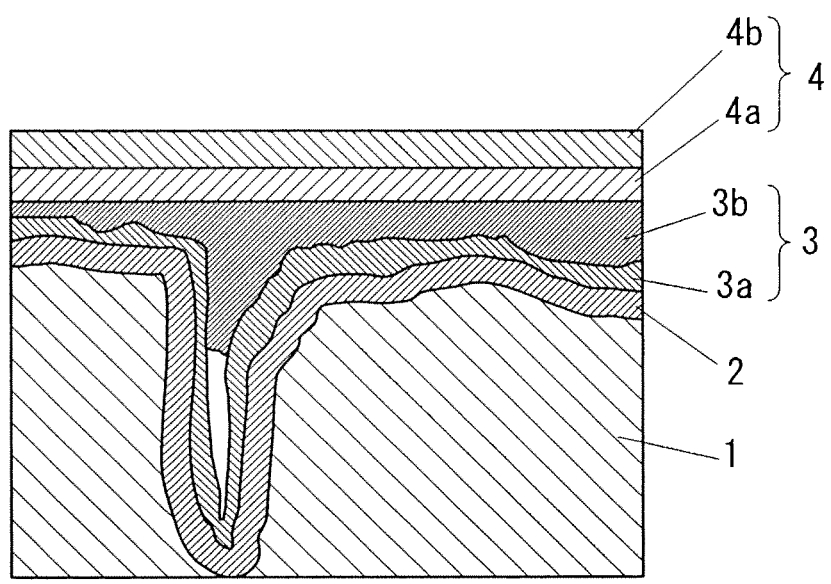

ELECTROCONDUCTIVE POLYMER COMPOSITION, ELECTROCONDUCTIVE POLYMER MATERIAL, ELECTROCONDUCTIVE SUBSTRATE, ELECTRODE AND SOLID ELECTROLYTIC CAPACITOR

This application is based upon and claims the benefit of priority from. Japanese patent application No. 2011-271246, filed on Dec. 12, 2011, the disclosure of which is incorporated herein in its entirety by reference.

BACKGROUND OF INVENTION

1. Field of the Invention

The present invention relates to an electroconductive polymer composition, an electroconductive polymer material, an electroconductive substrate, an electrode and a solid electrolytic capacitor.

2. Description of the Related Art

Electroconductive organic materials are utilized as an antistatic material or an electromagnetic shielding material as well as for electrodes of capacitors, electrochemical capacitors or the like, for electrodes of dye-sensitized solar cells, organic film solar cells or the like, for electrodes of electroluminescence displays, or the like.

As the electroconductive organic material, electroconductive polymers obtained by polymerizing pyrrole, thiophene, 3,4-ethylenedioxythiophene, aniline or the like are known. These electroconductive polymers are generally provided in a state of a dispersion liquid or a solution in an aqueous solvent, or in a state of a solvent in an organic solvent, and are used as an electroconductive polymer material after the solvent is removed.

Recently, an electroconductive polymer material with a higher electroconductivity is required, and it is variously studied. JP 2004-59666 A discloses a technology regarding an aqueous dispersion of a composite of a poly(3,4-dialkoxythiophene) with a polyanion and a method for producing the same, as well as a coating composition containing the aqueous dispersion and a coated substrate having a transparent electroconductive film to which the composition are applied. It is disclosed that a water-soluble compound having an amide bond, a water-soluble sulfoxide or the like is added to an aqueous dispersion of a composite of poly(3,4-dialkoxythiophene) with a polyanion in order to improve the electroconductivity of the coating film.

JP 2005-123630 A discloses a technology regarding a solid electrolyte produced from an electroconductive polymer, an electrolytic capacitor with a low equivalent series resistance and a low leakage current which consists of an outer layer containing an electroconductive polymer and a polymer anion, and a method for producing the same. It is disclosed that an additive such as an ether group-containing compound, a lactone group-containing compound, an amide or lactam group-containing compound, a sulfone or a sulfoxide, a sugar or a sugar derivative, a sugar alcohol, a furan derivative, or a polyalcohol is contained in order to further improve the electroconductivity of the electroconductive polymer.

JP 2000-153229 A discloses a thin film with a high electroconductivity which is obtained by applying a coating composition containing a non-protic chemical compound with dielectric constant $\in$ of 15 or more to a substrate and by drying it at a temperature lower than 100° C.

However, to these electroconductive organic materials, not only high electroconductivity and high transparency but also good film forming property of the electroconductive film to the substrate to the substrate is required as an essential factor in order to actually use it as an electrode. The good film forming property means a state that a shrinkage, a crack, a wrinkle and foam of the film are not generated when the solution is applied and dried. Also, as a result, the electroconductive film with such good film forming property often has a high electroconductivity, a high transparency and a good adhesion to the substrate.

As a method for improving the film forming property, a method by adding an additive (solid or liquid), a resin (binder), a surfactant or the like is generally known. However, if this is mixed, the dispersion state of the electroconductive polymer composition is often deteriorated and a good film forming property is not obtained.

JP 2004-59666 A, JP 2005-123630 A and JP 2000-153229 A disclose that the electroconductivity is improved by adding an additive to an electroconductive polymer composition in which a polyanion is doped. On the other hand, these do not at all disclose the dispersion state and the film forming property of the electroconductive polymer composition. If an additive suitable for a component of the electroconductive polymer is not used, the dispersion state of the electroconductive polymer is deteriorated, and the increase of the viscosity and the particle diameter occurs due to the aggregation. As a result, the film forming property of the electroconductive polymer composition is deteriorated, and a shrinkage, a crack, a wrinkle and foam of the film are generated. Also, the transparency of the electroconductive film is deteriorated due to the increase of the particle diameter.

The object of the present invention is to provide an electroconductive polymer composition with a good film forming property. Also, the object of the present invention is to provide an electroconductive polymer material with a high electroconductivity and a high transparency as well as an electroconductive substrate having the electroconductive polymer material on a substrate, and an electrode. Further, the object of the present invention is to provide an electronic device having the electrode as well as a solid electrolytic capacitor with a high capacitance and a low ESR.

SUMMARY OF THE INVENTION

The electroconductive polymer composition according to the present invention contains an electroconductive polymer in which a dopant is doped, a water-soluble polymer resin, and a solvent which contains water and an organic solvent whose dielectric constant is higher than that of water.

The electroconductive polymer material according to the present invention is obtained by drying the electroconductive polymer composition according to the present invention and by removing the solvent.

The electroconductive substrate according to the present invention has a layer containing the electroconductive polymer material according to the present invention on a substrate.

The electrode according to the present invention has the electroconductive substrate according to the present invention.

The electronic device according to the present invention has the electrode according to the present invention.

The solid electrolytic capacitor according to the present invention has a solid electrolyte containing the electroconductive polymer material according to the present invention.

According to the present invention, an electroconductive polymer composition with a good film forming property can be provided. Also, an electroconductive polymer material with a high electroconductivity and a high transparency as well as an electroconductive substrate and an electrode having the electroconductive polymer material on a substrate can be provided. Further, an electronic device having the electrode as well as a solid electrolytic capacitor with a high capacitance and a low ESR can be provided.

BRIEF DESCRIPTION OF THE DRAWING

FIG. 1 is a cross-sectional view showing an example of the solid electrolytic capacitor according to the present invention.

DETAILED DESCRIPTION OF THE PREFERRED EMBODIMENTS

According to the present invention, an electroconductive polymer composition which develops a good film forming property can be provided without damaging the dispersion state of the electroconductive polymer composition. Also, an electroconductive polymer material with a high electroconductivity and a high transparency as well as an electrode having the electroconductive polymer material on a substrate can be provided. Further, an electronic device having the electrode as well as a solid electrolytic capacitor with a high capacitance and a low ESR can be provided.

The reason that the electroconductive polymer composition according to the present invention does not damage the dispersion state is thought to be a reason described below. It is thought to be because the solvent dielectric constant (solvent kind) of the composition in which the modified water-soluble polymer resin having a hydrophilic group such as sulfonic acid group is dissolved or dispersed is changed and thereby the stretching of the polymer chain and the existence state of the polymer resin are changed due to the solvation.

The addition of an organic solvent whose dielectric constant is higher than that of water to the composition is accompanied with heat absorption. On the other hand, the addition of an organic solvent whose dielectric constant is lower than that of water to the composition is accompanied with heat generation. This is thought to be due to the solvation. If it is accompanied with heat absorption, it is thought that the intermolecular bond is cut to decrease the viscosity. On the other hand, if it is accompanied with heat generation, it is thought that the viscosity is increased due to hydration.

Here, the solvation is a phenomenon that a dissociated ion generated by ionization of a solute (single molecule or aggregate) is bonded to a solvent molecule by an intermolecular force (electrostatic interaction, ionic bond, hydrogen bond, coordination, or the like) and the solute is diffused in the solvent. Generally, from the relationship of the dissociated ion and the solvent dielectric constant, the Coulomb attraction between an anion ($q^-$) and a cation ($q^+$) is fixed. When the distance between both ions is (r) and the solvent dielectric constant is ($\in$), the Coulomb attraction is proportional to $(q^-)(q^+)/\in r^2$. Thus, if solvent dielectric constant ($\in$) becomes big, the Coulomb attraction is decreased and the force by which they are attracted to each other becomes weak.

In the electroconductive polymers disclosed in Patent Documents 1 to 3, a polyanion is used as a dopant for developing the electroconductivity, and the dopant is doped in the electroconductive polymer. On the other hand, the electroconductive polymer composition according to the present invention is a composition which contains an electroconductive polymer whose electroconductivity has been developed by doping an arbitrary dopant, a water-soluble polymer resin which does not function as a dopant, and an organic solvent, in which the water-soluble polymer resin is not doped to the electroconductive polymer. That is, the water-soluble polymer resin exists in a free state and the constitution of the electroconductive polymer composition is different.

Also, in the method by adding an additive for improving the electroconductivity which is disclosed in Patent Documents 1 to 3, it is an exemplification for a polythiophene dispersion in which a polyanion is doped. If the additive is added to the polythiophene dispersion having this constitution, the electroconductivity is improved but a good film forming property is not necessarily obtained.

Further, as described above, the present invention is realized by focusing on the difference of the existence state of the polymer resin from the relationship between the water-soluble polymer resin and solvent dielectric constant.
(Electroconductive Polymer Composition)

The electroconductive polymer composition according to the present invention contains an electroconductive polymer in which a dopant is doped, a water-soluble polymer resin, and a solvent which contains water and an organic solvent whose dielectric constant is higher than that of water.
[Electroconductive Polymer]

The electroconductive polymer according to the present invention is an electroconductive polymer in a state in which the electroconductivity is developed by doping a dopant. As the electroconductive polymer, a π-conjugated electroconductive polymer can be used. Examples of the m-conjugated electroconductive polymer include polypyrroles, polythiophenes, polyanilines, polyacetylenes, poly(p-phenylene)s, poly(p-phenylene vinylene)s, and poly(thienylene vinylene)s, and derivatives thereof which are substituted or non-substituted. Examples of the substituent include hydrogen atom, hydroxyl group, carboxyl group, nitro group, phenyl group, vinyl group, halogen atoms, acyl group, amino group, sulfonic acid group, sulfonyl group, carboxylic acid ester group, sulfonic acid ester group, alkoxyl groups, alkylthio groups, arylthio groups, C1-C18 alkyl groups which may have a substituent of these, C5-C12 cycloalkyl groups which may have a substituent of these, C6-C14 aryl groups which may have a substituent of these, and C7-C18 aralkyl groups which may have a substituent of these.

Among these, the electroconductive polymer preferably includes at least one selected from the group consisting of polypyrroles, polythiophenes and polyanilines, and derivatives thereof. Among these, the electroconductive polymer preferably contains a repeating unit of 3,4-ethylenedioxythiophene or a derivative thereof. In particular, the electroconductive polymer is preferably a poly(3,4-ethylenedioxythiophene) or a derivative thereof which has a repeating unit represented by following formula (1) from the viewpoint of the heat stability.

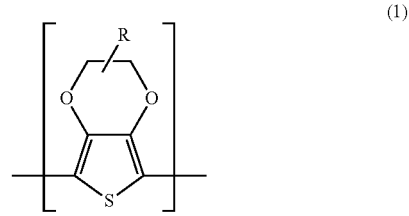

(1)

(In formula (1), R represents a substituted or non-substituted C1-C18 alkyl group, a substituted or non-substituted C5-C12 cycloalkyl group, a substituted or non-substituted C6-C14 aryl group, or a substituted or non-substituted C7-C18 aralkyl group, which is linear or branched.)

The electroconductive polymer may be a homopolymer or a copolymer. Also, this electroconductive polymer may be used alone, or in combination with two or more kinds.

As the dopant, an inorganic acid, an organic acid with a low molecular weight or an organic acid with a high molecular weight, or a salt thereof can be used.

As the inorganic acid, a proton acid such as, for example, sulfuric acid, nitric acid, phosphoric acid, perchloric acid, tetrafluoroboric acid, or hexafluorophosphoric acid can be used. This may be used alone, or in combination with two or more kinds.

Examples of the organic acid with a low molecular weight or the salt thereof include, for example, alkyl sulfonic acids, benzenesulfonic acid, naphthalenesulfonic acid, anthraquinone sulfonic acid, camphor sulfonic acid and derivatives thereof, and iron (III) salts thereof. The organic acid with a low molecular weight may be a monosulfonic acid, a disulfonic acid or a trisulfonic acid. Examples of the derivative of the alkyl sulfonic acid include, for example, 2-acrylamide-2-methylpropanesulfonic acid and dodecylbenzenesulfonic acid. Examples of the derivative of benzenesulfonic acid include, for example, phenolsulfonic acid, styrene sulfonic acid, toluenesulfonic acid and sulfophthalic acid. Examples of the derivative of the naphthalenesulfonic acid include, for example, 1-naphthalenesulfonic acid, 2-naphthalenesulfonic acid, 1,3-naphthalenedisulfonic acid, 1,3,6-naphthalenetrisulfonic acid and 6-ethyl-1-naphthalenesulfonic acid. Examples of the derivative of anthraquinone sulfonic acid include, for example, anthraquinone-1-sulfonic acid, anthraquinone-2-sulfonic acid, anthraquinone-2,6-disulfonic acid and 2-methylanthraquinone-6-sulfonic acid. Among these, benzenesulfonic acid, naphthalenesulfonic acid or iron (III) salts thereof are preferable. This may be used alone, or in combination with two or more kinds.

Examples of the organic acid with a high molecular weight include, for example, substituted or non-substituted polyacrylic resins such as poly(2-acrylamide-2-methylpropanesulfonic acid)s, substituted or non-substituted polyvinyl resins such as polyvinyl sulfonic acids, substituted or non-substituted polystyrene resins such as polystyrene sulfonic acids, substituted or non-substituted polyester resins such as polyester sulfonic acids, and copolymers containing one or more selected from these. Examples of the salt of the organic acid with a high molecular weight include, for example, lithium salts, sodium salts, potassium salts and ammonium salts of the organic acids with a high molecular weight. Among these, polystyrene sulfonic acids and polyester sulfonic acids are preferable. This may be used alone, or in combination with two or more kinds.

The dopant can be used alone, or in combination with two or more kinds.

The content of the electroconductive polymer contained in the electroconductive polymer composition is preferably 0.1 part by mass or more and 30 parts by mass or less with respect to 100 parts by mass of the solvent, and is more preferably 0.5 part by mass or more and 20 parts by mass or less.

The amount of the dopant doped to electroconductive polymer is preferably 40 parts by mass or more and 200 parts by mass or less with respect to 100 parts by mass of the electroconductive polymer, and is more preferably 60 parts by mass or more and 160 parts by mass or less. When the amount of the dopant is 40 parts by mass or more with respect to 100 parts by mass of the electroconductive polymer, a sufficient electroconductivity can be obtained. Also, when the amount of the dopant is 200 parts by mass or less with respect to 100 parts by mass of the electroconductive polymer, the dispersibility of the electroconductive polymer can be maintained.

The method for synthesizing the electroconductive polymer according to the present invention is not particularly limited. Examples thereof include, for example, a method described in EP 440957 A2. Also, the polymer can be synthesized by chemical oxidation polymerization or electropolymerization of a monomer giving an electroconductive polymer in a solvent containing a dopant by using an oxidant. The electroconductive polymer composition obtained may contain a component such as an unreacted monomer or a residual component derived from an oxidant, which is unnecessary for developing the electroconductivity. In this case, it is preferable to remove the component by the extraction by ultrafiltration, centrifuge separation or the like, by ion-exchange treatment, by dialysis treatment, or the like. The unnecessary component contained in the electroconductive polymer composition can be quantified by ICP atomic emission spectroscopy, ion chromatography, UV absorption or the like.

[Water-Soluble Polymer Resin]

The water-soluble polymer resin according to the present invention is contained in the electroconductive polymer composition for the purpose of improving the film forming property of the electroconductive polymer.

The water-soluble polymer resin is not particularly limited as long as it is compatible with or dispersible in the electroconductive polymer composition. "Water-soluble" in the water-soluble polymer resin means a property by which it can be soluble or homogenously dispersible in water. The water-soluble polymer resin preferably has a hydrophilic group. Examples thereof include, for example, a resin in a state of an aqueous solution or aqueous dispersion by the modification to water-soluble property. Also, it may be a thermosetting resin or may be a thermoplastic resin. Examples of the hydrophilic group include hydroxyl group, sulfonic acid group and carboxylic acid group, but sulfonic acid group is preferable.

Examples of the water-soluble polymer resin include, for example, polyethylene resins, polyester resins such as polyethylene terephthalates, polybutylene terephthalates and polyethylene naphthalates, polyimide resins such as polyimides and polyamide-imides, polyamide resins such as polyamides-6, polyamides-6,6, polyamides-12 and polyamides-11, fluorine resins such as polyvinylidene fluorides, polyvinyl fluorides, polytetrafluoroethylenes, ethylene tetrafluoroethylene copolymers and polychlorotrifluoroethylenes, vinyl resins such as polyvinyl alcohols, polyvinyl ethers, polyvinyl butyrals, polyvinyl acetates and polyvinyl chlorides, polystyrene resins, epoxy resins, xylene resins, aramid resins, polyurethane resins, polyurea resins, melamine resins, phenol resins, polyether resins and polyacrylic resins, and copolymer thereof, which have a hydrophilic group. This may be used alone, or in combination with two or more kinds. Among these, the water-soluble polymer resin is preferably at least one selected from the group consisting of polyacrylic resins, polystyrene resins, polyester resins, polyether resins, polyamide resins, phenol resins and vinyl resins, which have a hydrophilic group. The water-soluble polymer resin is more preferably a polyester resin having a sulfonic acid group or a polystyrene resin having a sulfonic acid group. The same compound as the dopant may be used as the water-soluble polymer resin.

The weight average molecular weight of the water-soluble polymer resin is not particularly limited, but is preferably 2000 to 700000, is more preferably 5000 to 500000, and is further preferably 10000 to 200000. Also, since the intrinsic viscosity varies according to the weight average molecular weight selected, the weight average molecular weight is appropriately selected so as to have a viscosity suitable for, for example, a method which is used when a film of the electroconductive polymer composition is formed on the substrate. The weight average molecular weight is a value calculated by GPC (gel permeation chromatograph) measurement.

The content of the water-soluble polymer resin in the electroconductive polymer composition can be in the range in which the electroconductivity of the electroconductive polymer material obtained is not extremely decreased. The ratio of the electroconductive polymer and the water-soluble polymer resin is preferably 1:0.01 to 5 in the mass ratio, and is more preferably 1:0.1 to 2.

[Solvent]

The solvent according to the present invention contains water and an organic solvent whose dielectric constant is higher than that of water (dielectric constant 78).

The dielectric constant roughly shows a polarity of the organic solvent. The dielectric constant is a value measured by a dielectric constant meter (product name: Model 871, made by Nihon Rufuto Co., Ltd.) at 25° C. The dispersibility of the electroconductive polymer in the electroconductive polymer composition is improved by the electroconductive polymer composition containing a water-soluble polymer resin having a hydrophilic group (polar group) such as hydroxyl group, sulfonic acid group or carboxylic acid group as well as the organic solvent with high polarity as a solvent. Also, the surface tension is decreased and the good film forming property is obtained by containing the organic solvent as a solvent.

Examples of the organic solvent whose dielectric constant is higher than that of water (dielectric constant 78) include formamide (FA, dielectric constant 110), N-methylformamide (dielectric constant 182), N-methylacetamide (dielectric constant 191) and N-methylpropionamide (dielectric constant 172). Among these, at least one selected from the group consisting of formamide (FA, dielectric constant 110), N-methylformamide (dielectric constant 182) and N-methylacetamide (dielectric constant 191) is preferable. This may be used alone, or in combination with two or more kinds.

Also, the solvent according to the present invention may be a mixed solvent which contains water and an organic solvent whose dielectric constant is higher than that of water, and further contains another organic solvent if needed. Here, the another organic solvent means an organic solvent whose dielectric constant is lower than or equal to that of water.

Specific examples of the another organic solvent include alcohol solvents such as methanol (dielectric constant 33), ethanol (dielectric constant 24), 1-propanol (dielectric constant 20), and 1-butanol (dielectric constant 18); aromatic hydrocarbon solvents such as benzene (dielectric constant 2.3), toluene (dielectric constant 2.4), and xylene; aliphatic hydrocarbon solvents such as hexane (dielectric constant 2.0); aprotic polar solvents such as N,N-dimethylformamide (DMF, dielectric constant 37), N,N-diethylformamide, N,N-dimethylacetamide (dielectric constant 38), dimethylsulfoxide (DMSO, dielectric constant 48), N-methylpyrrolidone (NMP, dielectric constant 32), acetonitrile (dielectric constant 37) and acetone (dielectric constant 21). Among these, the another organic solvent is preferably an aprotic organic solvent. This may be used alone, or in combination with two or more kinds.

The dielectric constant of the solvent is preferably 50 or more at 25° C. from the viewpoint of improving the dispersion state of the electroconductive polymer composition and film forming property, and is more preferably 70 or more.

The amount of the mixed organic solvent with respect to water in the solvent is not particularly limited as long as it is an amount in which the solvent can be dissolved in water, but is preferably 1% by mass or more and 100% by mass or less, and is more preferably 1% by mass or more and 70% by mass or less. Also, the amount of the mixed organic solvent in the electroconductive polymer composition is preferably 1% by mass or more and 70% by mass or less with respect to the mass of the electroconductive polymer composition, and is more preferably 1% by mass or more and 50% by mass or less. When the amount is 1% by mass or more, a good film forming property is obtained. Also, when the amount is 70% by mass or less, the drying time for removing the solvent can be shortened.

A thickener may be added to the electroconductive polymer composition according to the present invention for the purpose of controlling the viscosity to adapt the composition to various steps described below which is used when the electroconductive polymer layer is formed on the substrate. Examples of the thickener include water-soluble polymers such as arginic acid derivatives, xanthane gum derivatives, and sugar compounds such as carrageenan and cellulose. This may be used alone, or in combination with two or more kinds. The amount of the thickener added is not particularly limited, but the thickener is preferably contained at a rate of 60 mass % or less in the electroconductive polymer composition so as not to decrease the electroconductivity.

The electroconductive polymer composition according to the present invention may contain an electroconductive auxiliary agent for the purpose of further improving electroconductivity. Examples of the electroconductive auxiliary agent include metal particles, inorganic compounds such as metal oxides, carbon, and water-soluble compounds having a hydroxyl group. This may be used alone, or in combination with two or more kinds.

(Electroconductive Polymer Material)

The electroconductive polymer material according to the present invention is obtained by drying the electroconductive polymer composition according to the present invention and by removing the solvent. In the electroconductive polymer material according to the present invention, an electroconductive polymer and a water-soluble polymer resin are placed and configured in a suitable state, and the electroconductive polymer material has a good film forming property as well as a high electroconductivity and high transparency.

The method for drying the solvent is not particularly limited. The drying temperature for removing the solvent is preferably 80° C. or higher, and is more preferably equal to or higher than 100° C. which is a boiling point of water. The upper limit of the drying temperature is not particularly limited as long as it is equal to or lower than the decomposition temperature of the electroconductive polymer, but is preferably 300° C. or lower.

(Electroconductive Substrate, Electrode, Electronic Device)

The electroconductive substrate according to the present invention has a layer (hereinafter, referred to as electroconductive polymer layer) which has the electroconductive polymer material according to the present invention on a substrate. Also, the electrode according to the present invention has the electroconductive substrate according to the present invention. Also, the electronic device according to the present invention has the electrode according to the present invention.

The substrate according to the present invention is preferably a resin substrate, and is more preferably a transparent resin substrate. For example, the substrate is preferably a resin substrate which contains at least one selected from the group consisting of polyester resins, polyamide resins, polyimide resins, polyurethane resins, polystyrene resins, polyolefin resins, acrylic resins and vinyl ester resins. Specific examples thereof include films or sheets of polyethylene terephthalates (PET), polyethylene naphthalates, polyether sulfones, polyetherimides, polyether ether ketones, polyphenylene sulfides, polyarylates, polyimides, polycarbonates, cellulose triacetates, cellulose acetate propionates, and the like. Also, glass substrates and silicon substrates can also be used. Further, the electroconductive substrate may have a layer which has an ITO between the substrate and the electroconductive polymer layer.

The electroconductive substrate according to the present invention has an electroconductive polymer layer formed on at least one side of the substrate. The electroconductive substrate is preferably a transparent electroconductive substrate in which the electroconductive polymer layer is formed on at least one side of the transparent resin substrate.

As for the method for forming the electroconductive polymer layer, the layer can be formed by applying the electroconductive polymer composition according to the present invention to the surface of the substrate. The method of the application to the surface of the substrate is not particularly limited. Examples thereof include, for example, spin coating, gravure coating, bar coating, dip coating, curtain coating, die coating, and spraying coating. Further, printing methods such as screen printing, spraying printing, ink jet printing, anastatic printing, intaglio printing, and planographic printing can also be adopted.

The thickness of the paint film formed on the substrate is not particularly limited and can appropriately be selected depending on the purpose. For example, the thickness after drying is preferably 0.01 μm or more and 300 μm or less, and is more preferably 0.03 μm or more and 100 μm or less. When it is 0.01 μm or more, a sufficient electroconductivity can be developed. Also, when it is 300 μm or less, the electroconductivity proportional to the film thickness is obtained.

After that, the electroconductive polymer layer can be formed on the substrate by drying these and by removing the solvent. The method for drying the solvent is not particularly limited. The drying temperature for removing the solvent is preferably 80° C. or higher, and is more preferably equal to or higher than 100° C. which is a boiling point of water. The upper limit of the drying temperature is not particularly limited as long as it is equal to or lower than the decomposition temperature of the electroconductive polymer, but is preferably 300° C. or lower. Also, it is preferably determined with consideration for the heat resistance of the substrate.

The total light transmittance of the electroconductive substrate according to the present invention is preferably 70% or more, is more preferably 80% or more, and is further preferably 85% or more. The total light transmittance can be made 70% or more by arbitrarily adjusting the film thickness of the electroconductive polymer layer. The total light transmittance is a value measured by HAZE MATER NHD-5000 (made by NIPPON DENSHOKU INDUSTRIES CO., LTD.).

The electroconductive substrate according to the present invention can be used as an electrode, particularly as a transparent electrode. For example, it can be used as a hole-injecting layer or a cathode of an electronic device such as a solar cell or an organic electroluminescence displays. Also, it can be used as an electrode of an electronic device such as a touch panel or an electronic paper.

(Solid Electrolytic Capacitor)

The solid electrolytic capacitor according to the present invention has a solid electrolyte containing the electroconductive polymer material according to the present invention. A solid electrolytic capacitor with a high capacitance and a low ESR can be developed by the solid electrolyte containing the electroconductive polymer material according to the present invention.

A schematic cross-sectional view showing a conformation of the solid electrolytic capacitor according to an embodiment of the present invention is shown in FIG. 1. The solid electrolytic capacitor has a conformation in which, dielectric layer 2, solid electrolyte layer 3 and cathode conductor 4 are laminated in this order on anode conductor 1.

Anode conductor 1 is formed of a plate, a foil or a wire of a valve action metal; of a sintered body containing a valve action metal fine particle; of a porous body metal subjected to a surface area enlargement treatment by etching; or the like. Specific examples of the valve action metal include tantalum, aluminum, titanium, niobium, zirconium and alloys thereof. Among these, it is preferably at least one selected from the group consisting of aluminum, tantalum and niobium.

Dielectric layer 2 is a layer which can be formed by electrolytic oxidation of the surface of anode conductor 1 and is also formed on the porous part of the sintered body, the porous body, or the like. The thickness of dielectric layer 2 can be appropriately adjusted by the voltage of the electrolytic oxidation.

Solid electrolyte layer 3 contains at least an electroconductive polymer material obtained by removing a solvent from the electroconductive polymer composition according to the present invention. Examples of the method for forming solid electrolyte layer 3 include, for example, a method by application or immersion of the electroconductive polymer composition according to the present invention on dielectric layer 2 and by removal of the solvent in the electroconductive polymer composition.

The application or immersion method is not particularly limited, but it is preferably left for several minutes to several dozen minutes after application or immersion in order to sufficiently fill the electroconductive polymer composition in the inside of the porous pore. The repeating immersions and the reduced or pressured system are preferable.

The removal of the solvent from the electroconductive polymer composition can be carried out by drying the electroconductive polymer composition. The method for drying the solvent is not particularly limited. The drying temperature for removing the solvent is preferably 80° C. or higher, and is more preferably equal to or higher than 100° C. which is a boiling point of water. The upper limit of the drying temperature is not particularly limited as long as it is equal to or lower than the decomposition temperature of the electroconductive polymer, but is preferably 300° C. or lower from the viewpoint of preventing the element deterioration by heat. Also, it is preferably determined with consideration for the heat resistance of the substrate. The drying time must appropriately be optimized by the drying temperature, but is not particularly limited as long as it is in the range in which the electroconductivity is not decreased.

Solid electrolyte layer 3 may further contain an electroconductive polymer having pyrrole, thiophene, aniline and a derivative thereof; an oxide derivative such as manganese dioxide or ruthenium oxide; or an organic semiconductor such as TCNQ (7,7,8,8-tetracyanoquinodimethane complex salt).

Solid electrolyte layer 3 can have a two-layered structure of first solid electrolyte layer 3a and second solid electrolyte layer 3b as shown in FIG. 1. For example, first solid electrolyte layer 3a containing an electroconductive polymer is formed on dielectric layer 2 by chemical oxidation polymerization or electropolymerization of a monomer giving the electroconductive polymer. Second solid electrolyte layer 3b can be formed by application or immersion of the electroconductive polymer composition according to the present invention on first solid electrolyte layer 3a and by removal of the solvent.

As the monomer, at least one selected from the group consisting of pyrrole, thiophene, aniline and derivatives thereof can be used. As a dopant used for chemical oxidation polymerization or electropolymerization of the monomer to obtain a polymer, sulfonic acid compounds such as alkyl sulfonic acids, benzenesulfonic acid, naphthalenesulfonic acid, anthraquinone sulfonic acid, and camphor sulfonic acid, and derivatives thereof are preferable. This may be used alone, or in combination with two or more kinds. The molecular weight of the dopant can be appropriately selected and used from a low molecular weight compound to a high molecular weight body. As the solvent, only water may be used and a mixed solvent of water and an organic solvent soluble to water may be used.

The electroconductive polymer contained in first solid electrolyte layer 3a is preferably the same kind of polymer as the electroconductive polymer contained in second solid electrolyte layer 3b.

Cathode conductor 4 is not particularly limited as long as it is a conductor, but can have, for example, a two-layered structure consisting of carbon layer 4a such as graphite and of silver electroconductive resin 4b.

(Method for Producing Electroconductive Polymer Composition)

The method for producing an electroconductive polymer composition according to the present invention includes mixing a water-soluble polymer resin with a solvent which contains water and an organic solvent whose dielectric constant is higher than that of water to prepare a resin solution and mixing the resin solution with an electroconductive polymer in which a dopant is doped. As the water-soluble polymer resin, the organic solvent whose dielectric constant is higher than that of water, and the electroconductive polymer in which a dopant is doped, the above-mentioned compounds can be used. The mixing method in each step is not particularly limited.

EXAMPLES

As follows, the present invention is further concretely explained based on the Examples, but the present invention is not limited to only these examples, and also includes those in the range based on the scope of the present invention.

Example 1

An aqueous dispersion of a poly(3,4-ethylenedioxythiophene) as an electroconductive polymer in which a polystyrene sulfonic acid was doped (product name: Poly(3,4-ethylenedioxythiohene)/Poly(Styrenesulfonate), made by Aldrich) was pulverized by using a beads mil to have a desired particle diameter. The aqueous dispersion of the poly(3,4-ethylenedioxythiophene) had a solid content of 1.3% by mass, and contained 0.5% by mass of poly(3,4-ethylenedioxythiophene) and 0.8% by mass of polystyrene sulfonic acid. The aqueous dispersion of the poly(3,4-ethylenedioxythiophene) had a viscosity of 1.25 mPa·s, an average particle diameter of 103.3 nm, and a surface resistance value of $2.52 \times 10^4 \Omega/\square$. The aqueous dispersion of the poly(3,4-ethylenedioxythiophene) was navy blue.

Next, 0.25 g of a 20% by mass aqueous solution of a polystyrene sulfonic acid (weight average molecular weight: $5 \times 10^4$) containing a polystyrene sulfonic acid as a water-soluble polymer resin and 1 g of formamide (FA) as an organic solvent were stirred (700 rpm) at room temperature for 1 hour to prepare a resin solution. The mixing was accompanied with heat absorption.

The total amount of the resin solution was pored into 10 g of the aqueous dispersion of the poly(3,4-ethylenedioxythiophene), and the mixture was stirred (700 rpm) at room temperature for 1 hour to obtain an electroconductive polymer composition. The poring of the resin solution was accompanied with heat absorption in solution. The electroconductive polymer composition obtained was navy blue.

The viscosity and the average particle diameter of the electroconductive polymer composition were measured. Also, the droplet spreading, the film forming property of the film, and the surface resistance value of the film were measured. The results are shown in TABLE 1.

The viscosity was measured by VISCOMATE MODEL VM-10A (product name, made by CBC Co., Ltd.). The average particle diameter was measured by Zeta-potential & Particle size Analyzer ELSZ (product name, made by Otsuka Electronics Co., Ltd.).

As for the droplet spreading, 100 μl of the electroconductive polymer composition was dropped on a glass slide and was left for 1 minute, and the droplet spreading was then measured to evaluate it.

The evaluations of the film forming property of the film and the surface resistance value of the film were carried out by dropping 100 μl of the electroconductive polymer composition on a glass slide and leaving it for 1 minute, and then by drying it at 120° C. for 15 minutes to produce a film.

The observation of the appearance was conducted and the film forming property was determined by the following criteria.

A: The shrinkage of the dried film is less than 10% with respect to the diameter of the dropped liquid, and a crack, a wrinkle and foam are not generated.

B: The shrinkage of the dried film is 10% or more with respect to the diameter of the dropped liquid, or a crack, a wrinkle and foam are generated.

C: The shrinkage of the dried film is 10% or more with respect to the diameter of the dropped liquid, and a crack, a wrinkle and foam are generated.

The surface resistance value of the film was measured by Loresta-GP MCP-610 (product name, made by Mitsubishi Chemical Analytech Co., Ltd.).

Examples 2 to 6 and Comparative Examples 1 to 3

Electroconductive polymer compositions were prepared in the same manner as in Example 1 except that the organic solvents shown in TABLE 1 were respectively used as an organic solvent, and the compositions were evaluated. The results are shown in TABLE 1. In Comparative Example 3, water was mixed instead of an organic solvent. Each electroconductive polymer composition obtained was navy blue. In Examples 4 to 6 and in Comparative Examples 1 and 2, the mixing of DMSO or DMF was accompanied with heat generation.

TABLE 1

| | | resin solution | | | | | | | | | |
|---|---|---|---|---|---|---|---|---|---|---|---|
| | poly (3,4-ethylene dioxythiophene) aqueous dispersion (g) | 20% by mass aqueous solution of polystylene sulfonic acid (Mw: 50000) (g) | FA (g) | DMSO (g) | DMF (g) | water (g) | viscosity (mPa·s) | average particle diameter (nm) | droplet spreading (mm, diameter) | film forming property | surface resistance (Ω/□) |
| Example 1 | 10 | 0.25 | 1.0 | — | — | — | 1.94 | 120.8 | 18.0 | A | $1.48 \times 10^2$ |
| Example 2 | 10 | 0.50 | 1.0 | — | — | — | 2.43 | 199.6 | 19.5 | A | $1.79 \times 10^2$ |
| Example 3 | 10 | 0.50 | 3.0 | — | — | — | 2.49 | 161.8 | 23.0 | A | $2.86 \times 10^2$ |
| Example 4 | 10 | 0.50 | 2.4 | 0.6 | — | — | 2.51 | 157.7 | 22.0 | A | $2.96 \times 10^2$ |
| Example 5 | 10 | 0.50 | 1.5 | 1.5 | — | — | 2.87 | 176.8 | 21.0 | A | $2.89 \times 10^2$ |

TABLE 1-continued

| | poly (3,4-ethylene dioxythiophene) aqueous dispersion (g) | 20% by mass aqueous solution of polystyrene sulfonic acid (Mw: 50000) (g) | FA (g) | DMSO (g) | DMF (g) | water (g) | viscosity (mPa·s) | average particle diameter (nm) | droplet spreading (mm, diameter) | film forming property | surface resistance (Ω/□) |
|---|---|---|---|---|---|---|---|---|---|---|---|
| Example 6 | 10 | 0.50 | 0.6 | 2.4 | — | — | 3.83 | 286.9 | 19.0 | B (10% shrinkage) | $2.59*10^2$ |
| Comparative example 1 | 10 | 0.50 | — | 3.0 | — | — | 3.85 | 264.7 | 18.5 | B (20% shrinkage) | $3.24*10^2$ |
| Comparative example 2 | 10 | 0.50 | — | — | 3.0 | — | 3.71 | 305.1 | 18.0 | B (40% shrinkage) | $2.71*10^2$ |
| Comparative example 3 | 10 | 0.50 | — | — | — | 3.0 | 2.24 | 204.4 | 18.5 | B (wrinkle generation in the center) | $3.78*10^5$ |

From TABLE 1, in Examples 1 to 5, the electroconductive polymer compositions had a low viscosity and a small average particle diameter. Also, since the viscosity was low, the droplet spreading was also good and good film forming property was shown. Although the surface resistance was approximately equal to those of Comparative Examples 1 and 2 in which an organic solvent was used, it was lower than that of Comparative Example 3 in which water was used. In Example 6, since the viscosity was high and the average particle diameter was large, the film forming property was slightly deteriorated, but it was good as compared to Comparative Examples 1 and 2.

Examples 7 to 9 and Comparative Examples 4 to 6

A 20% by mass aqueous solution of a polystyrene sulfonic acid (weight average molecular weight $50 \times 10^4$) was used as a water-soluble polymer resin which was used for the resin solution. Also, the organic solvent shown in TABLE 2 was used as an organic solvent. Electroconductive polymer compositions were prepared in the same manner as in Example 1 except for these, and the compositions were evaluated. The results are shown in TABLE 2. In Comparative Example 6, water was mixed instead of an organic solvent. Each electroconductive polymer composition obtained was navy blue. In Examples 7 to 9, the mixing of FA was accompanied with heat absorption. Also, in Comparative Examples 4 and 5, each mixing of DMSO or DMF was accompanied with heat generation.

TABLE 2

| | poly (3,4-ethylene dioxythiophene) aqueous dispersion (g) | 20% by mass aqueous solution of polystyrene sulfonic acid (Mw: 500000) (g) | FA (g) | DMSO (g) | DMF (g) | water (g) | viscosity (mPa·s) | average particle diameter (nm) | film forming property | surface resistance (Ω/□) |
|---|---|---|---|---|---|---|---|---|---|---|
| Example 7 | 10 | 0.25 | 1.0 | — | — | — | 2.95 | 205.0 | A | $1.37*10^2$ |
| Example 8 | 10 | 0.50 | 1.0 | — | — | — | 4.65 | 305.2 | A | $1.89*10^2$ |
| Example 9 | 10 | 0.50 | 3.0 | — | — | — | 4.52 | 332.5 | A | $2.90*10^2$ |
| Comparative example 4 | 10 | 0.50 | — | 3.0 | — | — | 7.42 | 434.4 | A | $2.95*10^2$ |
| Comparative example 5 | 10 | 0.50 | — | — | 3.0 | — | 6.99 | 556.9 | B (10% shrinkage) | $2.08*10^2$ |
| Comparative example 6 | 10 | 0.50 | — | — | — | 3.0 | 4.02 | 318.7 | B (wrinkle generation in the center) | $4.53*10^5$ |

From TABLE 2, Examples 7 to 9 showed the same tendency of the results in Examples 1 to 3, and the evaluation results were good even when the weight average molecular weight of the water-soluble polymer resin was high. In Comparative Example 4, although the film forming property was good, the viscosity of the electroconductive polymer composition was high and the average particle diameter was large, which are unfavorable. This is because the transparency is decreased due to the large average particle diameter. This is also because the permeability into the inside of the porous body is deteriorated and the sufficient capacitance is not obtained when it is used for a condenser.

Examples 10 to 12 and Comparative Examples 7 to 9

A 25% by mass aqueous dispersion of a polyester (weight average molecular weight $4.8 \times 10^4$, having a sulfonic acid group as a hydrophilic group) was used as a water-soluble polymer resin which was used for the resin solution. Also, the organic solvent shown in TABLE 3 was used as an organic solvent. Electroconductive polymer compositions were prepared in the same manner as in Example 1 except for these, and the compositions were evaluated. The results are shown in TABLE 3. In Comparative Example 9, water was mixed instead of an organic solvent. Each electroconductive polymer composition obtained was navy blue. In Examples 10 to 12, the mixing of FA was accompanied with heat absorption. Also, in Comparative Examples 7 and 8, each mixing of DMSO or DMF was accompanied with heat generation.

Comparative Examples 10 to 15

In the preparation of the resin solution, the organic solvent shown in TABLE 4 was used as an organic solvent without using a water-soluble polymer resin. Electroconductive polymer compositions were prepared in the same manner as in Example 1 except for this, and the compositions were evaluated. The results are shown in TABLE 4. Each electroconductive polymer composition obtained was navy blue. In Comparative Examples 10 and 11, the mixing of FA was accompanied with heat absorption. Also, in Comparative Examples 12 to 15, each mixing of DMSO or DMF was accompanied with heat generation.

TABLE 3

| | poly (3,4-ethylene dioxythiophene) aqueous dispersion (g) | resin solution 25% by mass aqueous dispersion of polyester (Mw: 48000) (g) | FA (g) | DMSO (g) | DMF (g) | water (g) | viscosity (mPa·s) | average particle diameter (nm) | film forming property | surface resistance (Ω/□) |
|---|---|---|---|---|---|---|---|---|---|---|
| Example 10 | 10 | 0.2 | 1.0 | — | — | — | 1.34 | 62.2 | A | $1.46*10^2$ |
| Example 11 | 10 | 0.2 | 3.0 | — | — | — | 1.44 | 83.2 | A | $2.10*10^2$ |
| Example 12 | 10 | 0.4 | 3.0 | — | — | — | 1.45 | 68.8 | A | $2.47*10^2$ |
| Comparative example 7 | 10 | 0.4 | — | 3.0 | — | — | 2.12 | 77.3 | B (40% shrinkage) | $3.55*10^2$ |
| Comparative example 8 | 10 | 0.4 | — | — | 3.0 | — | 2.08 | 87.9 | B (70% shrinkage, crack generation) | unmeasurable |
| Comparative example 9 | 10 | 0.4 | — | — | — | 3.0 | 1.17 | 49.6 | B (wrinkle generation in the center) | $1.61*10^5$ |

From TABLE 3, in Examples 10 to 12, the evaluation results were good as well as Examples 1 to 9 in which a 20% by mass polystyrene sulfonic acid aqueous solution was used as a water-soluble polymer resin. Thus, it has been found that the same effect is achieved regardless of the skeleton of the water-soluble polymer resin if the polymer resin is water-soluble even when it is a solution or even when it is a dispersion.

TABLE 4

| | poly (3,4-ethylene dioxythiophene) aqueous dispersion (g) | organic solvent | | | film forming property | surface resistance (Ω/□) |
|---|---|---|---|---|---|---|
| | | FA (g) | DMSO (g) | DMF (g) | | |
| Comparative example 10 | 10 | 1.0 | — | — | B (20% shrinkage, wrinkle generation) | $2.18*10^2$ |
| Comparative example 11 | 10 | 3.0 | — | — | B (10% shrinkage) | $2.23*10^2$ |
| Comparative example 12 | 10 | — | 1.0 | — | B (30% shrinkage, wrinkle generation) | $2.56*10^2$ |
| Comparative example 13 | 10 | — | 3.0 | — | B (30% shrinkage) | $2.75*10^2$ |
| Comparative example 14 | 10 | — | — | 1.0 | B (30% shrinkage, wrinkle generation) | $1.09*10^3$ |
| Comparative example 15 | 10 | — | — | 3.0 | C (60% shrinkage, crack generation) | unmeasurable |

From TABLE 4, it has been found that the film forming property is low when a water-soluble polymer resin is not contained even when an organic solvent is mixed to a poly(3,4-ethylenedioxythiophene) aqueous dispersion in which a polystyrene sulfonic acid is doped. On the other hand, the surface resistance was decreased as compared to the case in which an organic solvent was not included.

Example 13

100 µl of the electroconductive polymer composition prepared in Example 1 was dropped on a glass slide as a substrate, and a coating was carried out by using a spin coater at 1000 rpm for 5 seconds and continuously at 3000 rpm for 30 seconds. After that, it was dried at 85° C. for 15 minutes to obtain an electroconductive substrate. The total light transmittance of the electroconductive substrate obtained was measured. The result is shown in TABLE 5. The total light transmittance of the glass slide was 91.39%. The total light transmittance was measured by using HAZE MATER NHD-5000 (product name, made by NIPPON DENSHOKU INDUSTRIES CO., LTD.).

Examples 14 to 16

Electroconductive substrates were produced and the total light transmittances were measured in the same manner as in Example 13 except that the substrate shown in TABLE 5 was used as a substrate and the electroconductive polymer composition shown in TABLE 5 was used as an electroconductive polymer composition. The results are shown in TABLE 5. A polyester film (product name: DIAFOIL MR-100, made by Mitsubishi Polyester Film, Inc.) with a thickness of 100 µm was used as a polyester film. Also, the total light transmittance of the polyester film was 88.37%.

TABLE 5

| | substrate | electroconductive polymer composition | total light transmittance (%) |
|---|---|---|---|
| Example 13 | glass slide | Example 1 | 88.02 |
| Example 14 | | Example 7 | 87.45 |
| Example 15 | | Example 10 | 89.12 |
| Example 16 | polyester film | Example 10 | 86.12 |

From TABLE 5, all the total light transmittances of the electroconductive substrates in Examples 13 to 16 were 80% or more, and electroconductive substrates with high transparency were obtained.

Example 17

A porous aluminum was used as an anode conductor containing a valve action metal. An oxide film was formed on the surface of the aluminum metal by anodizing the anode conductor. Then, the anode conductor on which the dielectric layer was formed was immersed in the electroconductive polymer composition prepared in Example 3 for 1 minute. After it was pulled up, it was dried and solidified at 120° C. These operations were repeated 10 times to form a solid electrolyte layer. After that, a graphite layer and a silver containing resin layer were formed in this order on the solid electrolyte layer to obtain a solid electrolytic capacitor.

The electrostatic capacitance of the solid electrolytic capacitor obtained was measured by using an LCR meter at a frequency of 120 Hz. The result is shown in TABLE 6.

Comparative Example 16

A solid electrolytic capacitor was produced and the electrostatic capacitance was measured in the same manner as in Example 17 except that the electroconductive polymer composition prepared in Comparative Example 1 was used. The result is shown in TABLE E 6.

TABLE 6

| | electroconductive polymer composition | electrostatic capacitance (µF) |
|---|---|---|
| Example 17 | Example 3 | 8.7 |
| Comparative example 16 | Comparative example 1 | 6.5 |

From TABLE 6, a solid electrolytic capacitor with a high capacitance was obtained in Example 17. This is thought to be because that the electroconductive polymer composition prepared in Example 3 has a low viscosity and a small average particle diameter, and thereby the permeability into the inside of the porous body is excellent and the film forming property on the oxide film is good. On the other hand, in Comparative Example 11, since the electroconductive polymer solution prepared in Comparative Example 1 had a high viscosity and a large average particle diameter, the permeability into the inside of the porous body was low and the film forming property on the oxide film was low, and due to these a sufficient capacitance could not be obtained.

Example 18

A porous aluminum was used as an anode conductor containing a valve action metal. An oxide film was formed on the surface of the aluminum metal by anodizing the anode conductor. Then, the anode conductor on which the dielectric layer was formed was immersed in a solution of 3,4-dioxythiophene as a monomer. After that, it was immersed in an oxidant liquid obtained by dissolving 20 g of p-toluenesulfonic acid as a dopant and 10 g of ammonium persulfate as an oxidant in 100 ml of pure water. The anode conductor was pulled up and a polymerization was carried out for 1 hour. These operations were repeated 5 times for chemical oxidation polymerization to form a first solid electrolyte layer.

The electroconductive polymer composition prepared in Example 3 was dropped on the first solid electrolyte layer, and it was dried and solidified at 120° C. Thus, a second solid electrolyte layer was formed. After that, a graphite layer and a silver containing resin layer were formed in this order on the second solid electrolyte layer to obtain a solid electrolytic capacitor.

The ESR (equivalent series resistance) of the solid electrolytic capacitor obtained was measured by using an LCR meter at a frequency of 100 kHz. The result is shown in TABLE 7. The value of the ESR was normalized from the total cathode area to a unit area (1 $cm^2$).

Comparative Example 17

A solid electrolytic capacitor was produced and the ESR was measured in the same manner as in Example 18 except that the electroconductive polymer composition prepared in Comparative Example 1 was used. The result is shown in TABLE 7.

TABLE 7

| | electroconductive polymer composition | ESR (mΩ · cm) |
|---|---|---|
| Example 18 | Example 3 | 2.1 |
| Comparative example 17 | Comparative example 1 | 2.8 |

From TABLE 7, a solid electrolytic capacitor with a low ESR was obtained in Example 18. Since the film forming property of the electroconductive polymer composition prepared in Example 3 was good, the contacts with the first solid electrolyte layer and/or the graphite layer were good and the ESR was low. On the other hand, in Comparative Example 17, since the film forming property of the electroconductive polymer composition of Comparative Example 1 was low, the contact resistance components with the first solid electrolyte layer and/or the graphite layer were increased and the ESR was high.

Reference Examples 1 to 3

As follows, the behaviors when an aqueous solution containing a water-soluble polymer resin is mixed with an organic solvent are explained based on the specific examples.

As the aqueous solution containing a water-soluble polymer resin, polystyrene sulfonic acid aqueous solutions (a) and (b) which contained a polystyrene sulfonic acid having a sulfonic acid group as a hydrophilic group were used. Also, by way of comparison, polyester aqueous dispersion (c) which contained a polyester resin was used.
(a) polystyrene sulfonic acid aqueous solution (solid content: 20% by mass, weight average molecular weight: $5 \times 10^4$)
(b) polystyrene sulfonic acid aqueous solution (solid content: 20% by mass, weight average molecular weight: $50 \times 10^4$)
(c) polyester aqueous dispersion (solid content: 25% by mass, weight average molecular weight: $4.8 \times 10^4$).

The following solvents were used as an organic solvent.
  formamide (FA, made by Wako Pure Chemical Industries, Ltd., a special grade chemical)
  dimethylsulfoxide (DMSO, made by Junsci Chemical Co., Ltd., a special grade chemical)
The relationship of the dielectric constant of these solvents is FA (110)>water (78)>DMSO (48).

2.4 g of each organic solvent or water was respectively mixed to 10 g of (a), (b) or (c), and the mixture was stirred (700 rpm) at room temperature for 1 hour to prepare a resin solution. At this time, regardless of (a), (b) and (c), the mixing of FA as an organic solvent was accompanied with heat absorption, and the mixing of DMSO was accompanied with heat generation. Then, the solution viscosity, the film forming property and the total light transmittance of each resin solution were evaluated. The results are shown in TABLE 8.

The viscosity was measured by VISCOMATE MODEL VM-10A (product name, made by CBC Co., Ltd.). The viscosities of (a), (b) and (c), of each organic solvent and of water were as follows.
(a) 40.0 mPa·s
(b) 166.0 mPa·s
(c) 18.4 mPa·s
  FA: 3.78 mPa·s
  DMSO: 2.17 mPa·s
  Water: 0.86 mPa·s As for (c) that was an aqueous dispersion, the average particle diameter was measured. The average particle diameter was measured by using Zeta-potential & Particle size Analyzer ELSZ (product name, made by Otsuka Electronics Co., Ltd.).

The film forming property was evaluated and determined by appearance visual check. The sample was produced by dropping 100 μl of each resin solution on a glass slide, by leaving it for 1 minute and by drying it at 120° C. for 15 minutes.
(Criteria of Appearance Visual Check)
A: The shrinkage of the dried film is less than 10% with respect to the diameter of the dropped liquid, and a crack, a wrinkle and foam are not generated.
B: The shrinkage of the dried film is 10% or more with respect to the diameter of the dropped liquid, or a crack, a wrinkle, foam or the like are not generated.
C: The shrinkage of the dried film is 10% or more with respect to the diameter of the dropped liquid, and a crack, a wrinkle, foam or the like are not generated.

The sample used for the evaluation of the film forming property was used for the measurement of the total light transmittance. The total light transmittance was measured by using HAZE MATER NHD-5000 (product name, made by NIPPON DENSHOKU INDUSTRIES CO., LTD.). The total light transmittance of the glass slide used was 91.39%.

TABLE 8

| | polymer resin | item | FA | DMSO | water |
|---|---|---|---|---|---|
| Reference example 1 | (a) | viscosity (mPa·s) | 29.00 | 44.80 | 24.40 |
| | | film forming property | A | C | A |
| | | total light transmittance (%) | 90.19 | unmeasurable | 74.63 |
| Reference example 2 | (b) | viscosity (mPa·s) | 110.00 | 176.00 | 93.90 |
| | | film forming property | A | C | A |
| | | total light transmittance (%) | 85.48 | unmeasurable | 74.36 |
| Reference example 3 | (c) | viscosity (mPa·s) | 7.85 | 11.40 | 7.13 |
| | | average particle diameter (nm) | 156.50 | 246.70 | 225.10 |
| | | film forming property | A | C | B |
| | | total light transmittance (%) | 91.06 | unmeasurable | 89.90 |

From TABLE 8, the resin solution in which FA was mixed has a low viscosity and a better film forming property as compared to the resin solution in which DMSO was mixed. Also, in (c) of Reference Example 3, the average particle diameter was small. On the other hand, the film forming property of the resin solution in which DMSO was mixed was too low to form a film.

Also, as compared to the film obtained from the resin solution in which water was mixed, it had a high total light transmittance and a high transparency. Here, since the resin solutions of (a) and (b) were yellow, the film obtained from the resin solution in which water was mixed was yellow when the color of the formed film was visually checked. However, the film obtained from the resin solution in which FA was mixed was surprisingly changed into clearly near colorless.

In conclusion, by the above-mentioned function due to the difference of the solvent dielectric constant, the existence state of the water-soluble polymer resin in the solvent is changed. Thus, it is thought that the effect of the present invention can be obtained by the electroconductive polymer composition containing the resin solution.

The present invention can be utilized for electrodes of electronic devices such as solar cells, organic electroluminescence displays and touch panels, for solid electrolytic capacitors, and the like.

What is claimed is:
1. An electroconductive polymer composition, consisting of an electroconductive polymer in which a dopant is doped, a water-soluble polymer resin, and a solvent which comprises water and an organic solvent whose dielectric constant is higher than that of water,
  wherein the water-soluble polymer resin is at least one selected from the group consisting of polyacrylic resins, polystyrene resins, polyester resins, polyether resins, polyamide resins, phenol resins and vinyl resins, wherein the water-soluble polymer resin comprises a hydrophilic sulfonic acid group, and wherein the water-soluble polymer resin does not function as a dopant of the electroconductive polymer.

2. The electroconductive polymer composition according to claim 1, wherein the organic solvent is at least one selected from the group consisting of formamide, N-methylformamide and N-methylacetamide.

3. The electroconductive polymer composition according to claim 1, wherein the solvent further comprises an aprotic polar solvent.

4. The electroconductive polymer composition according to claim 1, wherein a dielectric constant of the solvent is 50 or more at 25° C.

5. The electroconductive polymer composition according to claim 1, wherein the electroconductive polymer comprises at least one selected from the group consisting of polypyrroles, polythiophenes and polyanilines, and derivatives thereof.

6. The electroconductive polymer composition according to claim 5, wherein the electroconductive polymer comprises a repeating unit of 3,4-ethylenedioxythiophene or a derivative thereof.

7. The electroconductive polymer composition according to claim 1, wherein a content of the dopant doped in the electroconductive polymer is 40 parts by mass or more and 200 parts by mass or less with respect to 100 parts by mass of the electroconductive polymer.

8. An electroconductive polymer material, obtained by drying the electroconductive polymer composition according to claim 1 and by removing the solvent.

9. The electroconductive polymer material according to claim 8, wherein the drying is carried out at 80° C. or higher and 300° C. or lower.

10. An electroconductive substrate, which comprises a layer comprising the electroconductive polymer material according to claim 8 on a substrate.

11. The electroconductive substrate according to claim 10, wherein the substrate is a resin substrate comprising at least one selected from the group consisting of polyester resins, polyamide resins, polyimide resins, polyurethane resins, polystyrene resins, polyolefin resins, acrylic resins and vinyl ester resins.

12. The electroconductive substrate according to claim 10, which comprises a layer comprising an ITO between the substrate and the layer comprising the electroconductive polymer material.

13. The electroconductive substrate according to claim 10, having a total light transmittance of 70% or more.

14. An electrode, comprising the electroconductive substrate according to claim 10.

15. An electronic device, comprising the electrode according to claim claim 14.

16. A solid electrolytic capacitor, which comprises a solid electrolyte comprising the electroconductive polymer material according to claim 8.

\* \* \* \* \*